United States Patent [19]

Lindau et al.

[11] 4,454,102

[45] Jun. 12, 1984

[54] METHOD OF PURIFYING FLUE GASES FROM SULPHUR DIOXIDE

[75] Inventors: Leif V. Lindau; Stefan O. H. Ahman, both of Växjö, Sweden

[73] Assignee: Flakt Aktiebolag, Nacka, Sweden

[21] Appl. No.: 303,462

[22] Filed: Sep. 18, 1981

[51] Int. Cl.³ .......................... B01J 8/00; C01B 17/00
[52] U.S. Cl. ...................................... 423/244; 423/242
[58] Field of Search .......... 423/242 A, 242 R, 244 A, 423/244 R, 210.5; 252/190, 192

[56] References Cited

U.S. PATENT DOCUMENTS

| | | | |
|---|---|---|---|
| 3,261,662 | 7/1966 | Axelson | 23/48 |
| 3,416,293 | 12/1968 | Alexander | 55/73 |
| 3,882,221 | 5/1975 | Wilson | 423/244 |
| 3,966,878 | 6/1976 | Pausch et al. | 423/242 |
| 3,976,747 | 8/1976 | Shale et al. | 423/244 |
| 4,177,158 | 12/1979 | Blue | 423/244 |
| 4,201,751 | 5/1980 | Holter et al. | 423/210 |
| 4,279,873 | 7/1981 | Felsvang et al. | 423/242 |

FOREIGN PATENT DOCUMENTS

| | | |
|---|---|---|
| 5301 | 11/1979 | European Pat. Off. |
| 1259845 | 2/1968 | Fed. Rep. of Germany . |
| 1544011 | 6/1969 | Fed. Rep. of Germany . |
| 1669315 | 2/1971 | Fed. Rep. of Germany . |
| 1769639 | 10/1971 | Fed. Rep. of Germany . |
| 2181988 | 7/1973 | France . |
| 54-72771 | 11/1979 | Japan ................................. 423/242 |

*Primary Examiner*—Gregory A. Heller
*Attorney, Agent, or Firm*—Dann, Dorfman, Herrell and Skillman

[57] ABSTRACT

Purification of gases from acid gas components according to the dry method means that the gas is contacted with an absorbent in a solid phase, which yields a relatively low reaction rate. In order to increase the reaction rate according to the invention, the gas is contacted with a mixture consisting partially of a solid absorbent phase and partially a liquid phase on the surface of the solid phase. At the purification of flue gases from sulphur dioxide hot gas is contacted with an absorption liquid in a drying apparatus, where evaporation of the water supplied and a reaction between sulphur dioxide and the absorption substance take place simultaneously, whereafter the solid product phase is separated from the gas in a dust separator and a slower, secondary absorption reaction is operative. In order to achieve a higher reaction rate in the dust separator, a substance is added to the flue gas which, together with other chemical species derived from the gas or the solid absorbent forms a liquid phase distributed over the surface of the solid phases. The liquid phase usually contains water and has a good solubility for reactants and reaction products.

7 Claims, No Drawings

METHOD OF PURIFYING FLUE GASES FROM SULPHUR DIOXIDE

Gases can be purified from sulfur dioxide components present therein by contacting the gas to be treated with an absorbent in a liquid phase (wet method) or in a solid phase (dry method). The present invention relates to a substantially dry method. As the dry method includes reaction steps implying diffusion of sulfur dioxide components into a solid phase, one of its disadvantages is a relatively low reaction rate.

The object of the present invention is to reduce the impact of the said disadvantage. This object is achieved according to the invention characterized by the attached claim 1.

By effecting a liquid aqueous phase with a high solubility for the participating reactants (sulfur dioxide components) on the surface of the solid absorbent particles, the reaction steps, viz dissolving of the sulfur dioxide component, diffusion, separation of absorbent and precipitation of reaction product, proceed substantially more rapid than the corresponding reaction steps when only gaseous and solid reactants are present. The absorbent may be an oxide, a carbonate or a hydroxide of an alkali metal. Illustrative absorbents are calcium carbonate, magnesium calcium carbonate, sodium carbonate, calcium hydroxide, sodium hydroxide or mixtures thereof. Calcium hydroxide, sodium hydroxide or mixtures thereof are the preferred absorbents. The liquid phase, may be derived from a hygroscopic salt, which at the prevailing gas temperature and gas water content (water partial pressure) is a thermodynamically stable molten hydrate.

In recent years a process for absorbtion of sulphur dioxide from a hot flue gas has come into use which in the literature is referred as "dry scrubbing". The process substantially comprises a drying step and a filtering step, and it operates as follows: The hot gas is contacted in a drying apparatus with an absorption liquid in the form of an atomized aqueous suspension or an aqueous solution capable of reacting with sulphur dioxide. In the drying apparatus evaporation of the supplied water (the water component of the atomized aqueous suspension or solution) takes place and simultaneously a reaction between sulphur dioxide and the absorbent occurs to form a solid reaction product. As the gas leaves the drying apparatus, the major part of the supplied water has evaporated, the gas temperature has decreased, the water vapour content of the gas has increased, and part of the sulphur dioxide has been absorbed to form the solid reaction product. The gas thereafter passes a dust separator where the solid reaction product remaining and any other solid material is separated from the gas. Part of the separated dust may be further recycled into the absorption liquid in order to increase the utilization of the absorbent.

This process often results in incomplete utilization of the absorbent during the drying period. After said period the reaction between the sulphur dioxide and the absorbent proceeds in the dust separator. This reaction, however, proceeds relatively slowly, since the reaction steps occur in solid phases.

The present invention has also the object of bringing about a higher reaction rate during said latter process step. This is achieved by the method defined in the attached subclaims.

This higher reaction rate is obtained by adding to the gas a limited amount of hygroscopic substances, such as hygroscopic salts which under the conditions prevailing in the dust separator form on the surface of the solid particles a liquid aqueous phase with sufficient solubility for the reactants. The hygroscopic substance may be added separately to the flue gas or may be mixed with the absorption liquid prior to its atomization. As the reaction steps, viz. solution of sulphur dioxide, diffusion of reactants and precipitation of product, proceed substantially more rapid than the corresponding steps in a solid phase, the net effect thereof is an increase in the total reaction rate. In order to prevent the operation of the dust separator from being jeopardized, the volume of the liquid phase must be small in relation to the volume of the solid phases, and in order to achieve a good effect, the liquid phase must be well distributed over the surface of the solid phases. For example, the added hygroscopic substance may constitute a maximum of about 20 percent, and preferably is no greater than about 5 percent by volume of said solid phase present at said dust separator. Examples of hygroscopic substances, the hydrate of which has the property of being in the liquid phase under the conditions prevailing at the absorption of sulphur dioxide from flue gases of fossil-fired boilers, $FeCl_3$, $Fe(NO_3)_3$, $Fe(NO_3)_2$, $Al(NO_3)_3$, $Ca(NO_3)_2$, $Mg(ClO_3)_2$, $MnCl_2$, $K_2SO_4$ $MgSO_4$, $NaAl(SO_4)_2$, $NaClO$, $Na_3PO_4$, $Na_2SiO_3$, $Na_2SO_4$ or $Zn(NO_3)_2$.

The absorbent added to the drying apparatus may be at least partially extracted from fly ash or gaseous substances present in or separated from the flue gas.

EXAMPLE

In a pilot plant with a capacity of 10 000 $Nm^3/h$ comprising a drying apparatus, into which atomized absorption liquid is injected, and a fabric filter as the dust separator, tests were carried out for determining the capacity with and without the addition of some of the aforesaid substances. Calcium hydroxide was used as absorbent which was added in an amount corresponding to a mole ratio $Ca/SO_2 = 1,1$ (calculated on ingoing gas). The ingoing gas had a temperature of 140° C. and an $SO_2$-content of 850 ppm.

The filtering velocity of the fabric filter was 92 m/h. The gas temperature after passing through the fabric filter was 70° C. The following $SO_2$ absorption efficiencies were measured.

| Test No. | Addition | Efficiency |
|---|---|---|
| 1 | — | 70 |
| 2 | $FeCl_3$ | 74 |
| 3 | $FeSO_4$ | 83 |
| 4 | $Fe(NO_3)_3$ | 81 |
| 5 | $Al(NO_3)_3$ | 71 |
| 6 | $Ca(NO_3)_2$ | 76 |
| 7 | $NaAl(SO_4)_2$ | 78 |
| 8 | $Na_2SO_4$ | 74 |
| 9 | $Zn(NO_3)_2$ | 77 |

We claim:

1. A method for purifying a gas containing sulphur dioxide components therein, which method comprises contacting said gas with a mixture consisting of (i) a solid absorbent and (ii) a liquid, hydrous phase, which liquid phase is derived from a hygroscopic salt selected from the group consisting of $FeCl_3$, $Fe(NO_3)_3$, $Fe(NO_3)_2$, $Al(NO_3)_3$, $Ca(NO_3)_2$, $Mg(ClO_3)_2$, $MnCl_2$, $K_2SO_4 \cdot MgSO_4$, $NaAl(SO_4)_2$, $NaClO$, $Na_3PO_4$, $Na_2SiO_3$, $Na_2SO_4$, and $Zn(NO_3)_2$ which hygroscopic salt is thermodynamically stable at the prevailing water partial pressure and temperature of said gas and which at least partly covers said solid absorbent, and preparing said mixture by adding to said solid absorbent said hygroscopic salt.

2. A method as defined in claim 1, wherein said gas consists of flue gas, said purifying process comprises a drying and absorption step, and a dust separation and secondary absorption step, and said solid absorbent is in an absorption liquid, and said absorption liquid and said liquid phase are added to said flue gas, said hygroscopic salt under conditions prevailing in the dust separator being adapted to distribute said liquid phase over the surface of said solid absorbent.

3. A method as defined in claim 1 or 2 wherein said sulphur dioxide components of said gas react with said solid absorbent to produce reaction products, and said liquid phase is aqueous and has good solubility for reactants and reaction products.

4. A method as defined in claim 2, wherein said added hygroscopic salt constitutes a maximum of 20 percent by volume of said solid absorbent present at said dust separator step.

5. A method as defined in claim 1 or 2 wherein said solid absorbent is selected from the group consisting of calcium hydroxide, calcium carbonate, magnesium calcium carbonate, sodium carbonate, sodium hydroxide or mixtures thereof.

6. A method as defined in claim 2 wherein said contacting step comprises atomizing said absorption liquid, and said hygroscopic salt is mixed in said absorption liquid prior to its atomization.

7. The method of claim 2, wherein said added hygroscopic salt constitutes a maximum of 5 percent by volume of said solid absorbent present at said dust separator.

* * * * *